(12) United States Patent
Choi et al.

(10) Patent No.: US 9,618,110 B2
(45) Date of Patent: Apr. 11, 2017

(54) SHIFT/TILT LOCKING APPARATUS AND METHOD FOR SHIFT LEVER OF AUTOMATIC TRANSMISSION

(71) Applicants: Hyundai Motor Company, Seoul (KR); Kia Motors Corporation, Seoul (KR); SL Corporation, Daegu (KR)

(72) Inventors: Jeehyuck Choi, Hwaseong-si (KR); Kwanggi Lee, Daegu (KR); Dongjae Kim, Gyeongsan-si (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 95 days.

(21) Appl. No.: 14/679,424

(22) Filed: Apr. 6, 2015

(65) Prior Publication Data

US 2015/0211631 A1    Jul. 30, 2015

Related U.S. Application Data

(62) Division of application No. 13/488,924, filed on Jun. 5, 2012, now Pat. No. 9,140,354.

(30) Foreign Application Priority Data

Nov. 28, 2011  (KR) .................. 10-2011-0125278

(51) Int. Cl.
*G05G 5/04*       (2006.01)
*F16H 59/10*     (2006.01)
(Continued)

(52) U.S. Cl.
CPC ......... *F16H 59/10* (2013.01); *F16H 59/0204* (2013.01); *F16H 61/22* (2013.01);
(Continued)

(58) Field of Classification Search
CPC .................. F16H 2061/223; F16H 59/0204
See application file for complete search history.

(56) References Cited

U.S. PATENT DOCUMENTS 4,947,970 A    8/1990  Miller et al.
5,025,901 A    6/1991  Kito et al.
(Continued)

FOREIGN PATENT DOCUMENTS

EP    0 307 846 A1    3/1989
EP    1 884 858 A1    2/2008
(Continued)

OTHER PUBLICATIONS

Why High End, Driving Modes, Copyright 2005 obtained from http://web.archive.org/liveweb/http://www.whyhighend.com/driving-modes.html.

*Primary Examiner* — Terence Boes
(74) *Attorney, Agent, or Firm* — Morgan, Lewis & Bockius LLP (57) ABSTRACT

A shift/tilt locking apparatus for shift lever of automatic transmission may include a shift knob, a main shaft slidably and rotatably disposed in a housing such that shift knob is slidable; a crossbar having shift knob at the upper end to tilt; a shift restriction device that allows shift knob to slide by selectively restricting sliding of main shaft; and a tilting restriction device controlling shift knob to tilt by selectively restricting the tilting of shift knob by using a third solenoid, which is controlled by a shift mode determining step that determines a shift mode by checking the position of shift knob and a lever locking step that restricts/releases shift knob by selectively operating first solenoid to third solenoid.

5 Claims, 13 Drawing Sheets

(51) Int. Cl.
 *F16H 59/02* (2006.01)
 *F16H 61/22* (2006.01)
 *F16H 59/08* (2006.01)

(52) U.S. Cl.
 CPC .. *F16H 59/0278* (2013.01); *F16H 2059/0221* (2013.01); *F16H 2059/082* (2013.01); *F16H 2061/223* (2013.01); *Y10T 74/20085* (2015.01)

(56) References Cited

U.S. PATENT DOCUMENTS

| | | |
|---|---|---|
| 5,197,003 A | 3/1993 | Moncrief et al. |
| 5,662,553 A | 9/1997 | Reichlinger |
| 5,671,638 A | 9/1997 | Hattori et al. |
| 5,685,405 A | 11/1997 | Morikawa et al. |
| 5,799,517 A | 9/1998 | Hattori et al. |
| 5,809,835 A | 9/1998 | Beim et al. |
| 5,895,435 A | 4/1999 | Ohta et al. |
| 5,941,793 A | 8/1999 | Ito et al. |
| 5,979,263 A | 11/1999 | Tomida et al. |
| 6,076,414 A | 6/2000 | Tabata et al. |
| 6,336,373 B1 | 1/2002 | Murai et al. |
| 6,362,810 B1 | 3/2002 | Matsuda |
| 6,676,562 B1 | 1/2004 | Bulgrien |
| 6,827,195 B2 | 12/2004 | Kliemannel |
| 6,948,582 B2 | 9/2005 | Shiomi et al. |
| 6,976,569 B2 | 12/2005 | Khaykin et al. |
| 7,213,483 B2 | 5/2007 | Inoguchi et al. |
| 7,293,480 B2 | 11/2007 | Matsui et al. |
| 7,308,838 B2 | 12/2007 | Inoguchi et al. |
| 7,681,706 B2 | 3/2010 | Umeda |
| 7,740,101 B2 | 6/2010 | Yanaka |
| 8,387,478 B2 | 3/2013 | Park et al. |
| 8,400,342 B2 | 3/2013 | Zimmerman et al. |
| 8,401,747 B2 | 3/2013 | Ito |
| 2004/0014559 A1 | 1/2004 | Bulgrien |
| 2004/0031660 A1 | 2/2004 | Kliemmanel |
| 2004/0138024 A1 | 7/2004 | Kano et al. |
| 2004/0195071 A1 | 10/2004 | Khaykin et al. |
| 2004/0226801 A1 | 11/2004 | De Jonge et al. |
| 2004/0254048 A1 | 12/2004 | Yone |
| 2007/0017312 A1 | 1/2007 | Yone |
| 2009/0171544 A1 | 7/2009 | Tanaka et al. |
| 2009/0222181 A1 | 9/2009 | Lindgren et al. |
| 2010/0289460 A1 | 11/2010 | Otake |
| 2011/0035123 A1 | 2/2011 | Katrak et al. |
| 2011/0036193 A1 | 2/2011 | Ueta et al. |
| 2012/0085193 A1* | 4/2012 | Heo ........................ F16H 59/04 74/473.18 |
| 2012/0095657 A1 | 4/2012 | Pudvay |
| 2013/0345941 A1 | 12/2013 | Katrak et al. |

FOREIGN PATENT DOCUMENTS

| | | |
|---|---|---|
| EP | 1 239 192 B1 | 12/2010 |
| JP | 61-38279 A | 2/1986 |
| JP | 61-201121 U | 12/1986 |
| JP | 5-118413 A | 5/1993 |
| JP | 7-21879 A | 1/1995 |
| JP | 10-258625 A | 9/1998 |
| JP | 2002-262549 A | 9/2002 |
| JP | 2003-133930 A | 5/2003 |
| JP | 4642419 B2 | 12/2010 |
| JP | 2011-37368 A | 2/2011 |
| KR | 1999-0086771 A | 12/1999 |
| KR | 10-2010-0123150 A | 11/2010 |
| KR | 10-2011-0006923 A | 1/2011 |
| KR | 10-2011-0062880 A | 6/2011 |
| KR | 10-2011-0062888 A | 6/2011 |

* cited by examiner

SHIFT/TILT LOCKING APPARATUS AND METHOD FOR SHIFT LEVER OF AUTOMATIC TRANSMISSION

CROSS-REFERENCE TO RELATED APPLICATIONS

The present application is a Divisional of U.S. patent application Ser. No. 13/488,924, filed Jun. 5, 2012, which claims priority of Korean Patent Application Number 10-2011-0125278 filed Nov. 28, 2011, the entire contents of which applications are incorporated herein for all purposes by this reference.

BACKGROUND OF INVENTION

Field of Invention

The present invention relates to a shift lever of an automatic transmission, and more particularly, to shift/tilt locking apparatus and method for a shift lever of an automatic transmission that allows a shift knob to slide and tilt according to a state of a vehicle or the driver's intention, or can restrict the operation of the shift knob.

Description of Related Art

Vehicles are equipped with a transmission for shifting, and recently, most vehicles are equipped with an automatic transmission.

For the shift lever operating the automatic transmissions of the vehicles, an integrated control electronic shift lever is applied to the shift lever for simple operating.

The integrated control electronic shift lever restricts or releases movement in a tilt motion direction in P-R-N-D shifting, and restricts or releases movement of the shift lever when it is switched into an echo-sports mode or a manual mode such that shifting is performed by operating the shift lever.

Although the integrated control electronic shift lever is simple because the operation distance decreases in comparison to the operation of conventional automatic transmission, a separate means for controlling the shifting in accordance with the state of the vehicle is necessary.

That is, when it fails to control the operation of the shift lever, an accident, such as sudden unintended acceleration, may occur due to unintended operation of the shift lever, such as a mistake with operating by a driver.

Therefore, the operation of the integrated control electronic shift lever is necessarily equipped with a means that can restrict/release the operation of the lever.

Meanwhile, Japanese Patent No. 4642419 relates to a device for locking a shift lever of an automatic transmission of a vehicle, which is a technology that can lock/unlock a shift lever with a lock plate and a link plate which rotate when electricity is supplied by a solenoid.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a shift/tilt locking apparatus and method for a shift lever of automatic transmission that is applied to the shift lever of an integrated control electronic automatic transmission and allows a shift knob to slide and tilt to fit the state of a vehicle or the driver's intention, or can restrict the operation of the shift knob.

Various aspects of the present invention provide for a shift/tilt locking apparatus for a shift lever of an automatic transmission, including: a shift knob; a main shaft slidably and rotatably in the circumferential direction disposed in a housing such that the shift knob is slidable forward/rearward and left/right; a crossbar coupled to the main shaft so as to cross the main shaft and provided with the shift knob at the upper end to tilt; a shift restriction means allowing the shift knob to slide or restricts sliding of the shift knob by selectively restricting sliding of the main shaft; and a tilting restriction means controlling the shift knob to tilt or not to tilt by selectively restricting the tilting of the shift knob at the upper end of the crossbar.

The shift restriction means may include a locking lever coupled to the main shaft and protruded toward to one side from the main shaft; and a first solenoid and a second solenoid having a first locking arm and a second locking arm, respectively, at the front and rear portions in the sliding direction of the locking lever in order to selectively restrict sliding of the locking lever, and operating to restrict the locking lever with the first locking arm and the second locking arm that extend/retract.

The first solenoid and the second solenoid may be latch solenoids.

The tilting restriction means may include a knob rotation shaft fixed to the upper end of the crossbar; a knob bracket receiving the knob rotation shaft, rotating relatively to the knob rotation shaft, and disposed in the shift knob; a sliding cam slidably disposed in the shift knob and engaged with the knob bracket when moving forward; a rotating arm rotatably disposed at the shift knob and sliding the sliding cam by rotating; and a third solenoid disposed at the crossbar and rotating the rotating arm by extending/retracting.

A connecting rod with both ends connected to the third solenoid and the rotating arm may be disposed between the third solenoid and the rotating arm.

The third solenoid may be a latch solenoid.

Various aspects of the present invention provide for a method of controlling a shift/tilt locking apparatus for a shift lever of an automatic transmission that includes a main shaft slidably disposed such that a shift knob is slidable forward/rearward and left/right, a crossbar coupled to the main shaft to cross the main shaft and having the shift knob at the upper end to tilt, shift restriction means having a first solenoid and a second solenoid that restrict/allow forward/rearward sliding of the shift knob, and a tilting restriction means having a third solenoid that restrict/allow tilting of the shift knob, the method including: a shift mode determining step that determines a shift mode by checking the position of the shift knob; and a lever locking step that restricts or releases the shift knob by selectively operating the first, second, and third solenoids.

The shift mode determining step may include a parking mode determining step that determines whether the shift knob is at a parking mode; a neutral mode determining step that determines whether the shift knob is at a neutral mode; a traveling mode determining step that determines whether the shift knob is at a traveling mode; and a rear-driving mode determining step that determines whether the shift knob is at a rear-driving mode.

The method may further include a parking control step that locks the first solenoid, the second solenoid, and the third solenoid, when the shift knob is positioned at a P-range in the parking mode determining step.

The method may further include a neutral control step that locks the first solenoid and the second solenoid, and unlocks the third solenoid, when the shift knob is at an N-range in the neutral mode determining step.

The method may further include a traveling control step that unlocks the first solenoid and locks the second solenoid and the third solenoid, when the shift knob is at a D-range in the traveling mode determining step.

The method may further include after the traveling mode determining step, a first echo-sports mode selecting step that determines whether the shift knob is positioned at the echo-sport mode; a first echo-sport control step that locks the first solenoid and the second solenoid and unlocks the third solenoid, when it is determined that the shift knob is positioned at the echo-sports mode in the first echo-sport mode selecting step; a manual mode selecting step that determines whether the shift knob is positioned at a manual mode when it is determined that the shift knob is not positioned at the echo-sports mode in the first echo-sports mode selecting step; and a manual mode control step that locks the first solenoid and the second solenoid and unlocks the third solenoid when it is determined that the shift knob is positioned at the manual mode in the manual mode selecting step.

The method may further include a rear-driving mode control step that locks the first solenoid and the third solenoid and unlocks the second solenoid when the shift knob is positioned at an R-range in the rear-driving mode determining step.

The method may further include after the parking control step, an unparking condition determining step that determines whether a vehicle is stopped or driven at a predetermined speed or less, a brake pedal is operating, and the shift lever is unlocked; and an unparking control step that unlocks the first solenoid and the second solenoid and locks the third solenoid, when the vehicle is stopped or driven at a predetermined speed or less, the brake pedal is operating, and the shift lever is unlocked.

A second echo-sports mode selecting step that determines whether the shift knob is at the echo-sports mode may be performed, when the vehicle is stopped or driven over a predetermined speed, the brake pedal is not operated, or the shift knob is locked in the unparking condition determining step; and a second echo-sports mode control step that locks the first solenoid and the second solenoid and unlocks the third solenoid is performed, when it is determined that the shift knob is at the echo-sports mode in the first echo-sports mode selecting step.

A diagnosing step may determine if any problem is occurred, when the parking mode determining step, the neutral mode determining step, the traveling mode determining step, or the rear-driving mode determining step is not satisfied, in the shift mode determining step.

According to the shift/tilt locking apparatus and method for shift lever of automatic transmission, which have the configuration described above, it may implement intended shifting and prevent unintended mis-operation by restricting or releasing the shift knob, using a plurality of solenoids when shifting with an integrated control electronic shift lever in accordance with the traveling conditions of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A shift/tilt locking apparatus for a shift lever of an automatic transmission according to various embodiments of the present invention includes a shift knob 10, a main shaft 21 that makes shift knob 10 slide forward/backward and left/right, a crossbar 23 that is coupled to main shaft 21 to cross main shaft 21 and has shift knob 10 that can tilt at the upper end, a shift restriction means that selectively restricts forward/backward movement of main shaft 21, and a tilting restriction means that selectively restricts tilting of shift knob 10.

Figure 1:
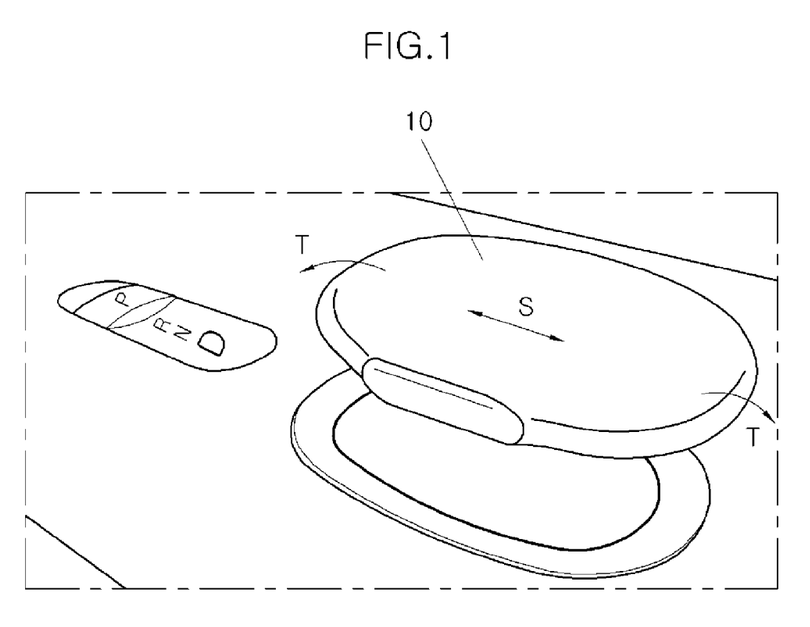
FIG. 1 is a perspective view when an integrated control electronic shift lever equipped with an exemplary shift/tilt locking apparatus for a shift lever of an automatic transmission according to the present invention is mounted on a console.

Shift knob 10, as shown in FIG. 1, is exposed at the upper portion of the console such that a driver can hold and operate shift knob 10. A knob bracket 11 that can tilt with respect to crossbar 23 described below is disposed in shift knob 10 to restrict tilting. Knob bracket 11 has a through-hole therein that is formed in the left-right direction of the vehicle, assuming that shift knob 10 tilts in the direction perpendicular to the tilting direction, that is, the front-rear direction of the vehicle. An engagement hole 11b that is engaged with the front end of a rotating arm 43, which is described below, is formed at a side of knob bracket 11. Shift knob 10 may return to the initial position after shifting.

Main shaft 21 can slide in the front-rear direction of the vehicle in a housing 20 and can rotate in the radial direction of main shaft 21. As main shaft 21 slides in the front-rear direction, it is possible to shift from the P-range to the N/R range or the N/D range, and when main shaft 21 radially rotates and shift knob 10 slides in the left-right direction, shift knob 10 can be operated in an echo-sports mode or a manual mode.

A locking lever 22 is coupled to a side of main shaft 21. One end of locking lever 22 is coupled to main shaft 21 and the other end thereof protrudes outward from main shaft 21, such that whether to lock main shaft 21 is determined in accordance with whether locking lever 22 is locked. That is, since locking lever 22 and main shaft 21 are integrally and/or monolithically formed, when locking lever 22 is locked, main shaft 21 is correspondingly locked, or when locking lever 22 is released, main shaft 21 is also released.

Crossbar 23 is coupled to main shaft 21 to cross main shaft 21. Since crossbar 23 and main shaft 21 are integrally coupled, crossbar 23 operates with main shaft 21, when sliding forward/backward and rotating left/right together with main shaft 21.

Crossbar 23 has shift knob 10, which can tilt, at the upper end, and a knob rotation shaft 24 is disposed integrally with crossbar 23 at the upper end of crossbar 23 and knob rotation shaft 24 is positioned in through-hole 11a of knob bracket 11, thereby allowing shift knob 10 to tilt.

The shift restriction means is composed of locking lever 22, and a first solenoid 31 and a second solenoid that operate a first locking arm 32 and a second locking arm 34.

First solenoid 31 and second solenoid 33 that individually extend/retract by external electric signals are provided and first locking arm 32 and second locking arm 34 are connected by links to first solenoid 31 and second solenoid 33, respectively. First locking arm 32 and second locking arm 34 are operated by extension/retraction of first solenoid 31 and second solenoid 33.

Meanwhile, first locking arm 32 and second locking arm 34 are disposed close to the other end of locking lever 22 and disposed at the front and rear portions in the sliding direction of main shaft 21.

First locking arm 32 has one end rotatably disposed in housing 20, in which one end is linked to first solenoid 31 and the other end is positioned close to the front or rear of locking lever 22.

Accordingly, when the other end of first locking arm 32 and the other end of locking lever 22 are maintained close to each other by extension/retraction of first solenoid 31, first locking arm 32 restricts locking lever 22 to slide to first locking arm 32, and when the other end of first locking arm 32 and the other end of locking lever 22 are spaced apart from each other, locking lever 22 is released.

Second locking arm 34 operates in the same way as first locking arm 32.

As described above, since first locking arm 32 and second locking arm 34 that are operated by first solenoid 31 and second solenoid 33 are disposed at the front and rear portion in the sliding direction of locking lever 22, locking lever 22 integrally and/or monolithically formed with main shaft 21 is restricted to slide or released to slide. Since first locking arm 32 and second locking arm 34 are disposed ahead of and behind locking lever 22, sliding of main shaft 21 is controlled. In this configuration, first locking arm 32 may be positioned ahead of or behind locking lever 22.

Figure 7:
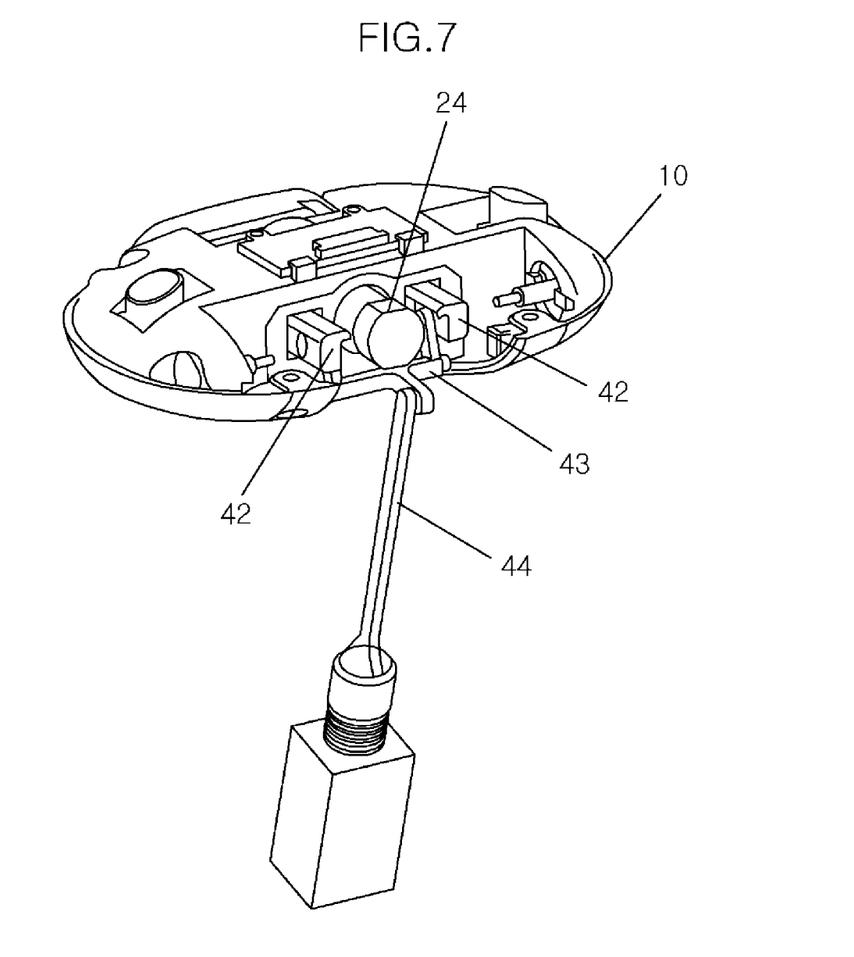
FIG. 7, FIG. 8 and FIG. 9 are partial perspective views showing the tilting principle of the shift knob of the shift/tilt locking apparatus for a shift lever of an automatic transmission according to the present invention.
Figure 8:
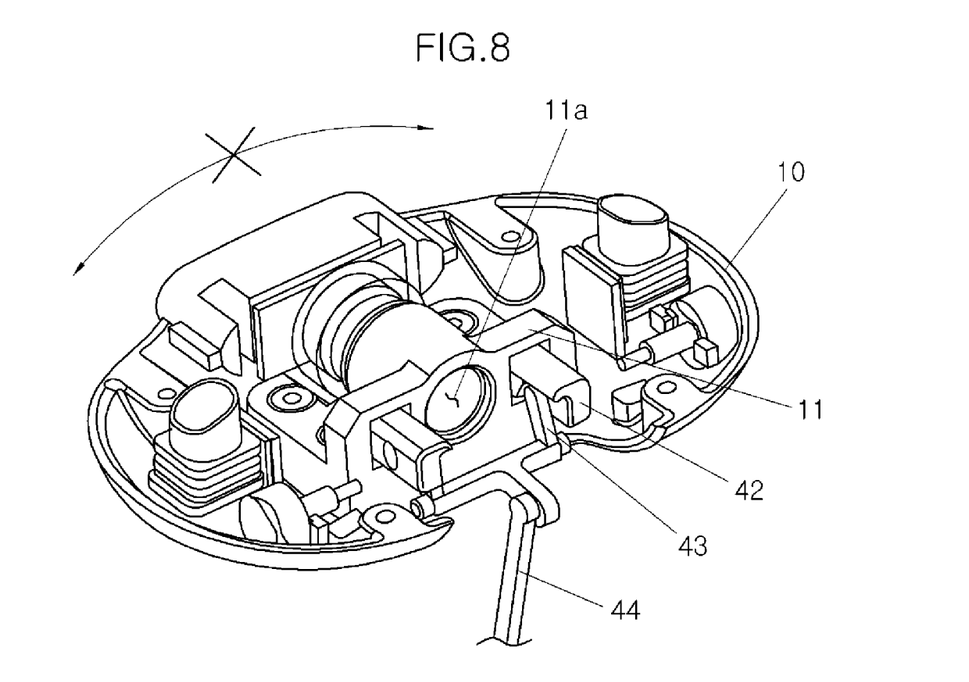
Figure 9:
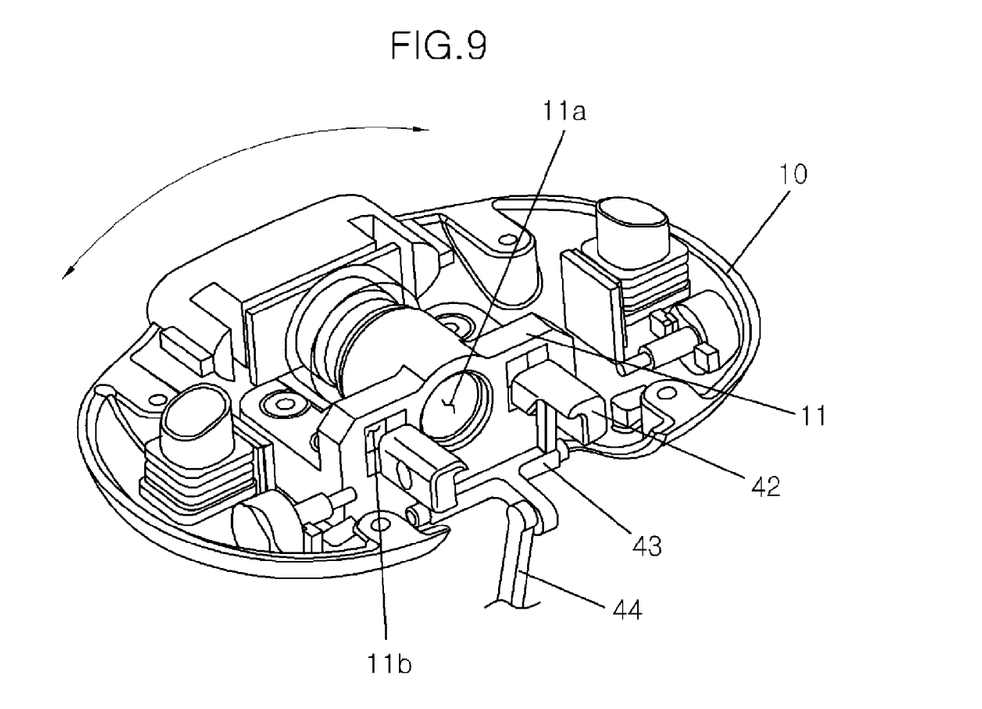

Tilting restriction means, as shown in FIGS. 7 to 9, includes a sliding cam 42 engaged with knob bracket 11 mounted on crossbar 23, a rotating arm 43 that slides sliding cam 42 by rotating, and a third solenoid 41 that rotates rotating arm 43.

An engagement hole 11b is formed at one side of knob bracket 11 disposed in shift knob 10.

Sliding cam 42 is slidably disposed in shift knob 10, and as sliding cam 42 moves forward, the front end is inserted into engagement hole 11b, and sliding cam 42 moves back, the front end is separated from engagement hole 11b. Shift knob 10 can tilt around knob rotation shaft 24, and when sliding cam 42 is inserted into engagement hole 11b of knob bracket 11, tilting of shift knob 10 is restricted, and when sliding cam 42 is separated from engagement hole 11b of knob bracket 11, shift knob 10 can tilt.

Rotating arm 43 moves sliding cam 42 forward or rearward. Rotating arm 43 is rotatably disposed in shift knob 10 and one end is connected to rotating arm 43, such that as rotating arm 43 rotates, sliding cam 42 moves forward or rearward.

Third solenoid 41 is fixed to crossbar 23 and connected to the other end of rotating arm 43, such that it rotates rotating arm 43 while extending/retracting.

Meanwhile, when third solenoid 41 and rotating arm 43 are spaced apart, third solenoid 41 and rotating arm 43 can be connected to both ends of a connecting rod 44, by disposing connecting rod 44 therebetween.

First solenoid 31, second solenoid 33, and third solenoid 41 may be latch type solenoids to maintain the control state right before power is cut, even if power is cut.

A shift/tilt locking apparatus for a shift lever of an automatic transmission having the configuration described above according to various embodiments of the present invention perform shifting by combining the operations of first solenoid 31, second solenoid 33, and third solenoid 41 such that shifting or tilting is restricted or allowed.

That is, first solenoid 31 and second solenoid 33 can restrict or release main shaft to move forward/rearward and third solenoid 41 can restrict or release shift knob 10 to tilt.

Figure 6:
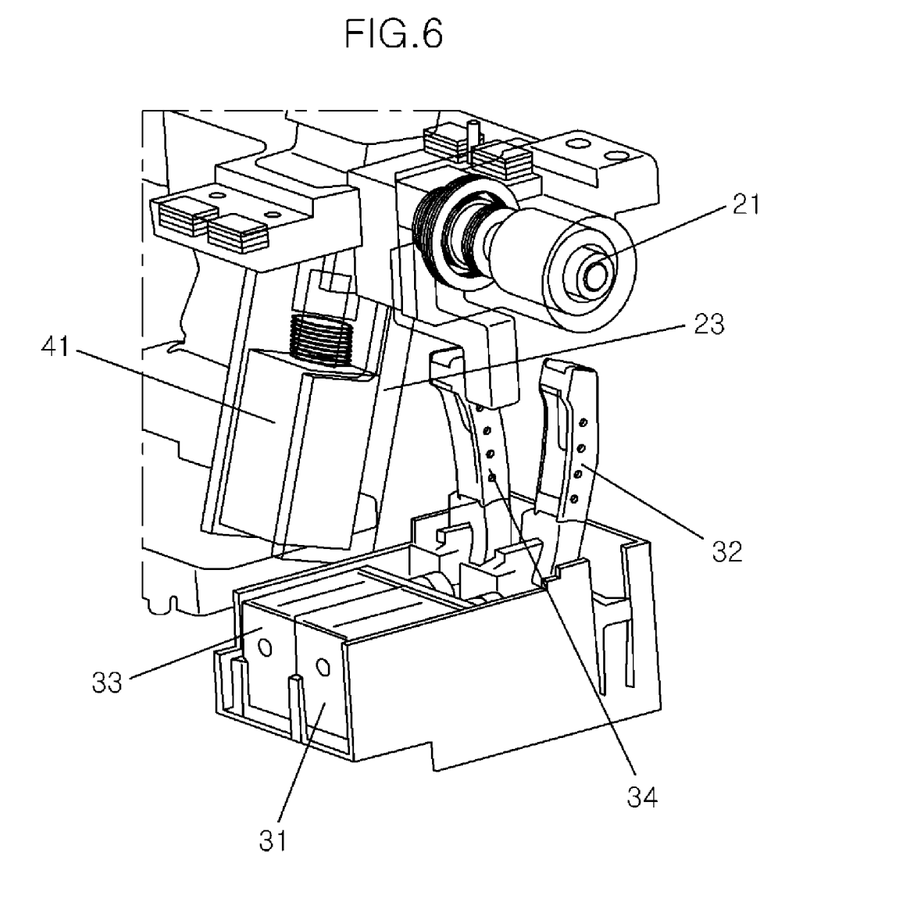
FIG. 6 is a partial enlarged perspective view of an exemplary shift/tilt locking apparatus for a shift lever of an automatic transmission according to the present invention.

For example, in FIG. 6, as first solenoid 31 operates, first locking arm 32 and locking lever 22 are spaced apart and second solenoid 33 does not operate, such that when second locking arm 34 keeps close to locking lever 22, main shaft 21 is released to the right in the figure and can slide, but is restricted in the opposite direction and cannot slide.

The fact that first solenoid 31, second solenoid 33, and third solenoid 41 restrict/release or lock/unlock the shift knob means that first solenoid 31, second solenoid 33, and third solenoid 41 make first locking arm 32 and second locking arm 34 restrict/release locking lever 22, or rotating arm 43 restricts/releases shift knob 10 to slide or to tilt by engaging/separating sliding cam 42 and knob bracket 11.

Figure 2:
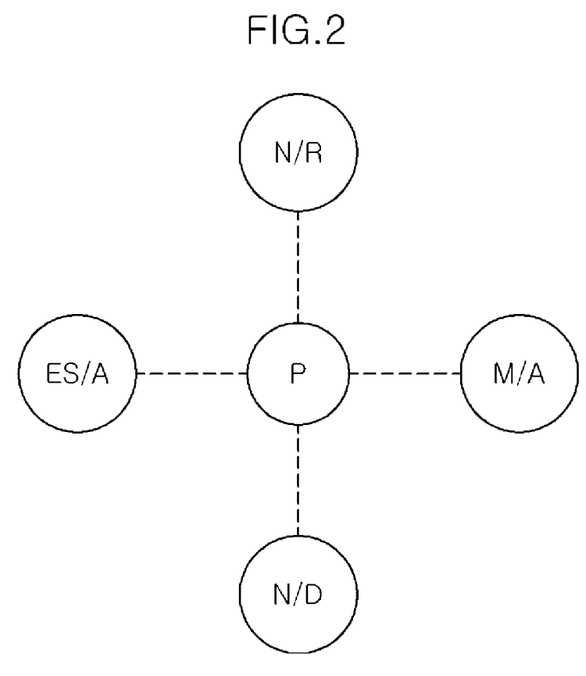
FIG. 2 is a conceptual view showing the path moving to shift ranges by an exemplary shift/tilt locking apparatus for a shift lever of an automatic transmission according to the present invention.
Figure 3A:
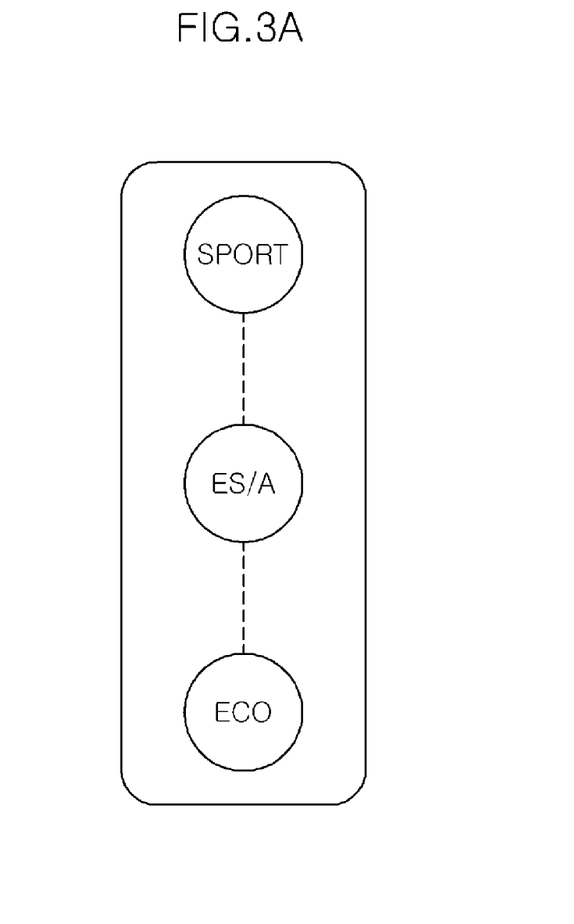
FIG. 3A and FIG. 3B are conceptual views showing the path moving path to the shift ranges when an echo-sports mode and a manual mode are selected in FIG. 2.
Figure 3B:
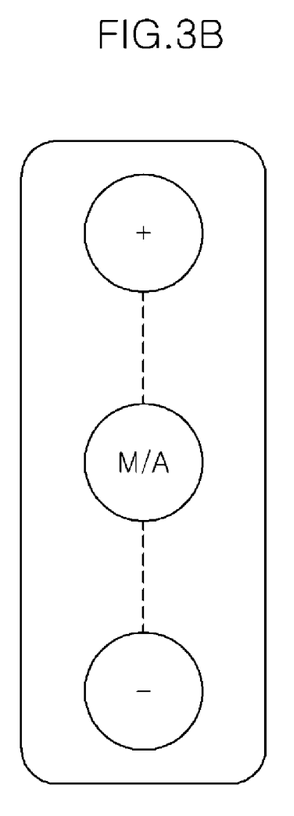

Shift knob 10, as shown in FIG. 2, performs shifting to the N/R-range or an N/D-range by sliding in the traveling direction of the vehicle and implements the echo-sports mode (ES) or the manual mode (M) by sliding in the direction perpendicular to the traveling direction of the vehicle. A shown in FIG. 3, shift knob 10 tilts forward to implement the sports mode and tilts rearward to implement the echo mode in the echo-sports mode, and tilts forward to implement high-speed shifting and tilts rearward to implement low-speed shifting in the manual mode.

Figure 4A:
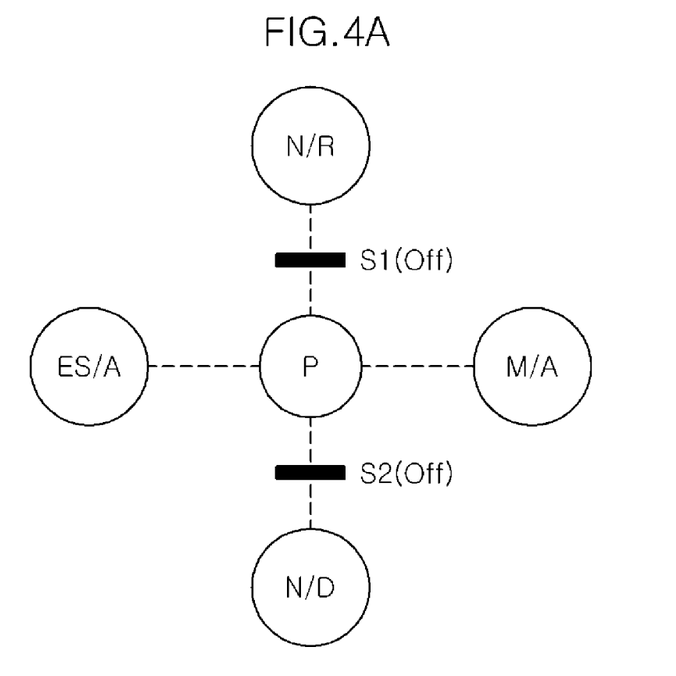
FIG. 4A and FIG. 4B are conceptual views showing the position of a solenoid that restricts movement to the shift ranges by an exemplary shift/tilt locking apparatus for a shift lever of an automatic transmission according to the present invention.
Figure 4B:
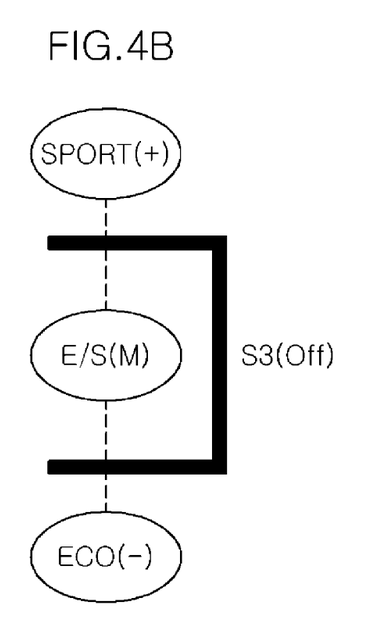
Figure 5:
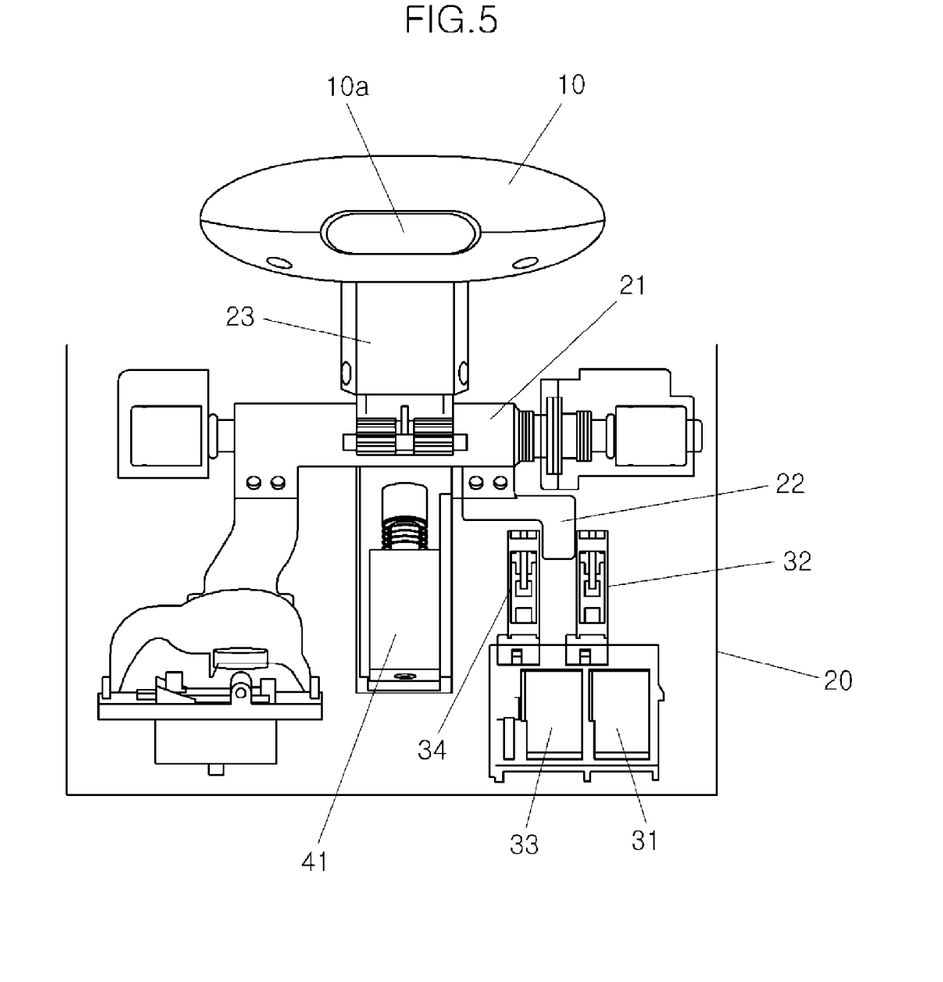
FIG. 5 is a front view of an exemplary shift/tilt locking apparatus for a shift lever of an automatic transmission according to the present invention.

While shift knob 10 slides or tilts for shifting, as described above, the sliding or tilting is restricted by first solenoid 31, second solenoid 33, and third solenoid 41, as shown in FIG. 4. For example, first solenoid 31 restricts/allows the sliding to the N/R-range, second solenoid 33 restricts/allows the sliding to the N/D-range, while third solenoid 41 restricts/allows the tilting for the echo mode or the sports mode in the echo-sport mode and restricts/allows the shifting to the high-speed shifting or the low-speed shifting in the manual mode.

Figure 10A:
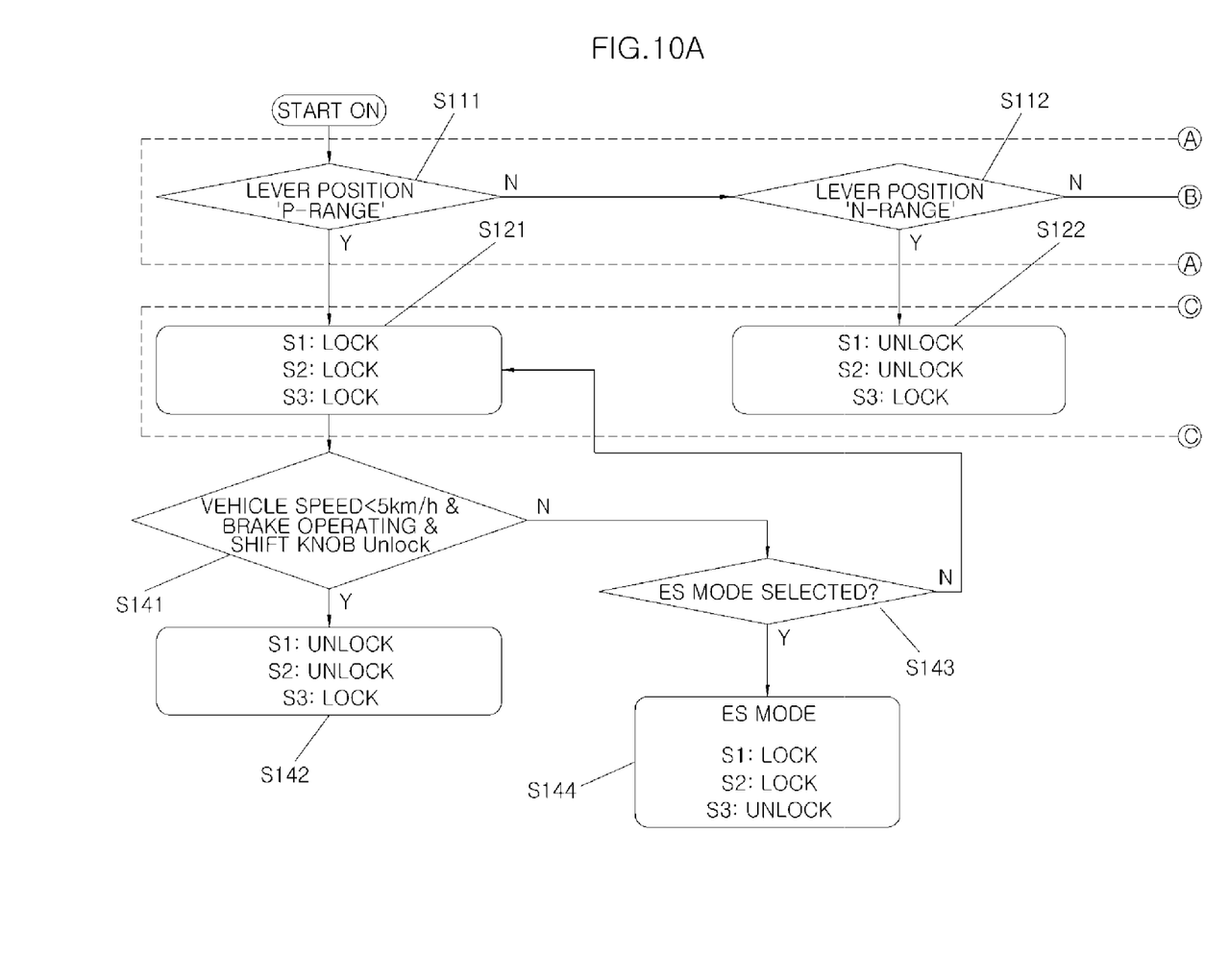
FIG. 10A and FIG. 10B are flowcharts showing an exemplary shift/tilt locking control method for a shift lever of an automatic transmission according to the present invention.
Figure 10B:
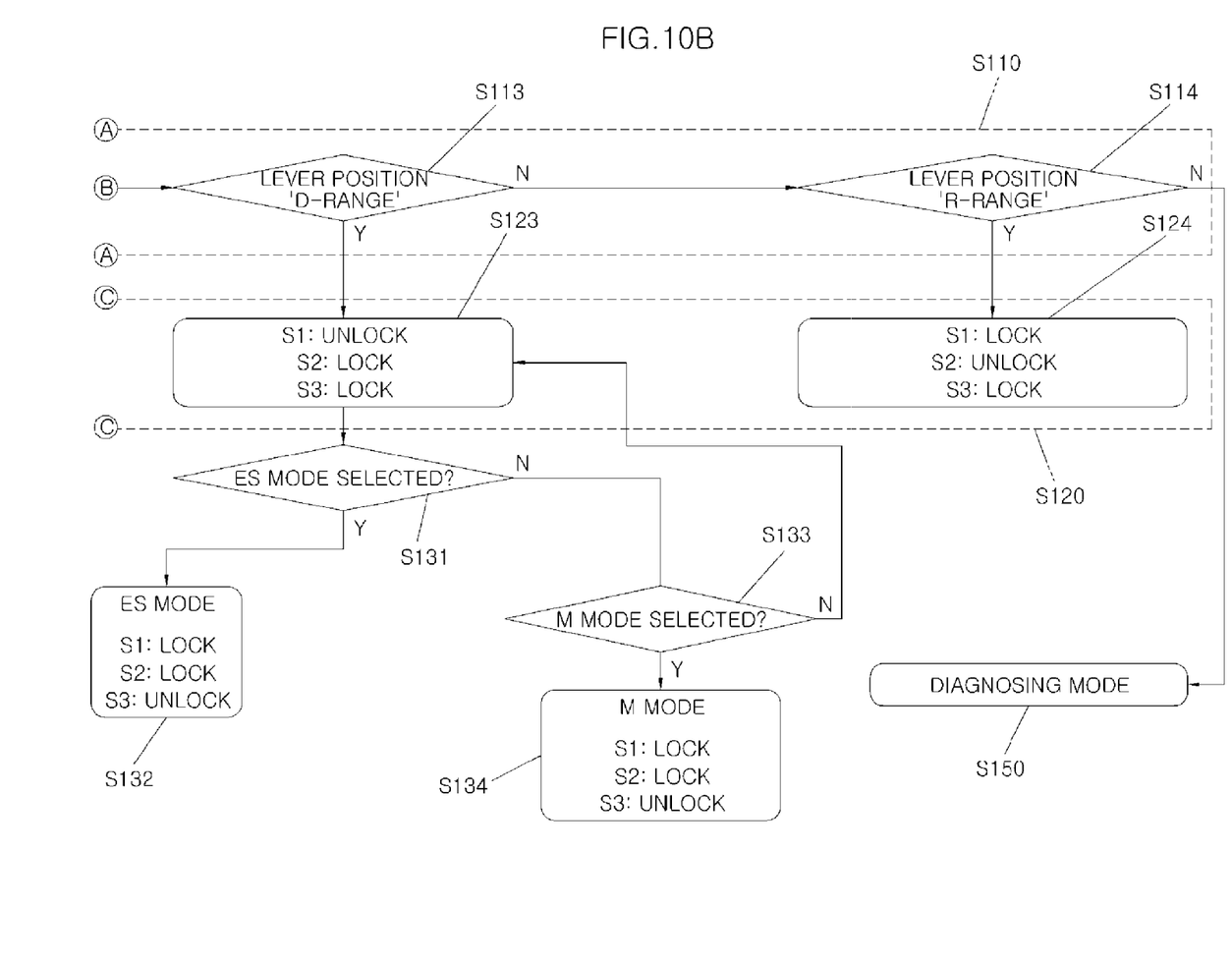

Meanwhile, as shown in FIG. 10, a shift/tilt locking method for a shift lever of an automatic transmission according to various embodiments of the present invention, uses the shift/tilt locking apparatus for a shift lever of an automatic transmission described above.

For example, the method includes a shift mode determining step S110 that determines the shift mode by checking the position of shift knob 10 and lever locking step S120 that restricts or releases the shift knob to shift to or keep the shift mode determined in the shift mode determining step (S110).

In the shift mode determining step S110, the position of shift knob 10 is checked and shifting according to the shift range that the driver intends is performed.

For this configuration, the shift mode determining step S110 includes a parking mode determining step S111, a neutral mode determining step S112, a traveling mode determining step S113, and a rear-driving mode determining step S114, in accordance with the Park (P), Neutral (N), Drive (D), and Rear (R).

The parking mode determining step S111, neutral mode determining step S112, traveling mode determining step S110, and rear-driving mode determining step S114 determine whether shift knob 10 is positioned at the Park (P), Neutral (N), Drive (D), and Rear (R).

In this process, the vehicle travels or moves rearward, through the neutral range, from the parking state and the frequency of traveling is higher that the rear movement, such that that the parking mode determining step S111, neutral mode determining step S112, traveling mode determining step S113, and rear-driving mode determining step S114 may be sequentially performed in this order in the shift mode determining step S110.

After the shift mode determining step S110, the lever locking step S120 is performed. A parking control step S121, a neutral control step S122, a traveling control step S123, or a rear-driving control step S124 is performed in accordance with the shift mode determined in the shift mode determining step S110.

The parking control step (S121) locks shift knob 10 by using first solenoid 31 and second solenoid 33 such that shift knob 10 is not shifted forward/rearward from the parking position and locks shift knob 10, by using third solenoid 41 such that shift knob 10 does not tilt.

The neutral control step (S122) unlocks first solenoid 31 and second solenoid 33 such that shift knob 10 can move to the N-range and locks third solenoid 41 such that shift knob 10 does not freely tilt.

The traveling control step (S123) unlocks first solenoid 31 and locks second solenoid 33 and third solenoid 41 such that shift knob 10 operates to the D-range, while the rear-driving control step (S124) locks first solenoid 31 and third solenoid 41 and unlocks second solenoid 33.

Meanwhile, it is possible to select the echo-sport mode (ES mode) that selects the echo mode in which a TCU shifts in priority to the fuel consumption of the vehicle and the sports mode that shifts in priority to the traveling performance or the manual mode (M mode) in which the driver freely shifts to a high range or a low range while traveling with the D-range. That is, it is possible to implement the sports mode by sliding shift knob 10 to the left and tilting forward the shift knob 10, implement the echo mode by sliding shift knob 10 to the left and tilting rearward the shift knob 10, manually shift to a high-speed range by sliding shift knob 10 to the right and tilting forward the shift knob 10, or manually shift to a low-speed range by sliding shift knob 10 to the right and tilting rearward the shift knob.

For this operation, when the driver operates shift knob 10 to select the echo-sports mode through a first echo-sports mode selecting step (S131) after the traveling control step (S123), first solenoid 31 and second solenoid 33 are locked such that forward/rearward sliding is restricted, and third solenoid 41 is unlocked to be able to select the echo mode or the sports mode by tilting.

Even if the driver operates shift knob 10 to select not the echo-sports mode, but the manual mode in the first echo-sports mode selecting step (S131), first solenoid 31 and second solenoid 33 are locked such that forward/rearward sliding is restricted, while third solenoid 41 is unlocked such that shifting to a high-speed range or low-speed range is performed by tilting.

Meanwhile, in order to slide shift knob 10 in the parking state (P range), it is determined that the unparking condition is satisfied (S141), and when the unparking condition is satisfied, first solenoid 31 and second solenoid 33 are unlocked and third solenoid 41 is locked to restrict tilting. The unparking condition is that the vehicle is stopped or driven at a low speed, the brake pedal is operating, and shift knob (10) has been released. It is determined that the vehicle is stopped or driven at a low speed, on the basis of a predetermined speed, for example, 5 km/h or less.

When the unparking condition is not satisfied, a second echo-sports mode selecting step (S143) is performed, and when shift knob 19 is operated to the echo-sports mode, first solenoid 31 and second solenoid 33 are locked and third solenoid 41 is unlocked.

The reason that the echo-sports mode selecting step is divided into the first echo-sports mode selecting step (S131) and the second echo-sports mode selecting step (S143) is based on the condition before the echo-sports mode selecting step, in which the first echo-sports mode selecting step (S131) is performed when the echo-sports mode is implemented when traveling with the D-range and the second echo-sports mode selecting step (S143) is performed when echo-sports mode is performed at the P-range.

When it is determined that all of the parking mode determining step (S111), neutral mode determining step (S112), traveling mode determining step (S113), and rear-driving mode determining step (S114) are not in the shift mode determining step (S110), a diagnosing step (S150) that diagnoses whether there is a problem is performed.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift/tilt locking apparatus for a shift lever of an automatic transmission, comprising:
    a shift knob;
    a main shaft slidable and rotatable in a circumferential direction disposed in a housing such that the shift knob is slidable in a forward/rearward direction and a left/right direction;
    a crossbar coupled to the main shaft so as to cross the main shaft, the crossbar including the shift knob at an upper end to tilt;
    a shift restriction means selectively allowing the shift knob to slide by selectively restricting sliding of the main shaft; and
    a tilting restriction means controlling the shift knob to tilt or not to tilt by selectively restricting tilting of the shift knob at the upper end of the crossbar,
    wherein the tilting restriction means includes:
    a knob rotation shaft fixed to the upper end of the crossbar;
    a knob bracket receiving the knob rotation shaft, rotating relatively to the knob rotation shaft, and disposed in the shift knob;
    a sliding cam slidably disposed in the shift knob and engaged with the knob bracket when moving forward;
    a rotating arm rotatably disposed at the shift knob and sliding the sliding cam by rotating; and
    a third solenoid disposed at the crossbar and rotating the rotating arm by extending/retracting.

2. The apparatus as defined in claim 1, wherein the shift restriction means includes:
    a locking lever coupled to the main shaft and protruding toward one side from the main shaft;
    a first solenoid and a second solenoid having a first locking arm and a second locking arm, respectively, at the front and rear portions in a sliding direction of the locking lever in order to selectively restrict sliding of the locking lever, and operating to restrict the locking lever with the first locking arm and the second locking arm that extend/retract.

3. The apparatus as defined in claim 2, wherein the first solenoid and the second solenoid are latch solenoids.

4. The apparatus as defined in claim 1, wherein a connecting rod having opposing ends connected to the third solenoid, and wherein the rotating arm is disposed between the third solenoid and the rotating arm.

5. The apparatus as defined in claim 1, wherein the third solenoid is a latch solenoid.

* * * * *